(12) United States Patent
Isshiki et al.

(10) Patent No.: US 8,004,956 B2
(45) Date of Patent: Aug. 23, 2011

(54) OPTICAL DISC DRIVE, OPTICAL PICKUP AND OPTICAL COMPONENT USED THEREFOR

(75) Inventors: Fumio Isshiki, Yokohama (JP); Katsuhiko Izumi, Kamakura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 570 days.

(21) Appl. No.: 12/053,797

(22) Filed: Mar. 24, 2008

(65) Prior Publication Data

US 2009/0086611 A1    Apr. 2, 2009

(30) Foreign Application Priority Data

Sep. 28, 2007   (JP) ................................. 2007-253036

(51) Int. Cl.
*G11B 7/135* (2006.01)
(52) U.S. Cl. ......... 369/112.24; 369/112.09; 369/112.11; 369/112.14; 369/112.21
(58) Field of Classification Search ............. 369/112.24, 369/112.09, 112.11, 112.14, 112.21
See application file for complete search history.

(56) References Cited

U.S. PATENT DOCUMENTS

| | | | |
|---|---|---|---|
| 5,684,779 A * | 11/1997 | Ohuchida et al. ........ | 369/112.12 |
| 5,784,354 A * | 7/1998 | Lee .......................... | 369/112.19 |
| 7,586,827 B2 * | 9/2009 | Hatano et al. ............ | 369/112.16 |
| 2002/0093902 A1 * | 7/2002 | Hirai et al. ............... | 369/112.17 |
| 2005/0207316 A1 * | 9/2005 | Ohyama ................... | 369/112.16 |
| 2006/0163459 A1 | 7/2006 | Park et al. | |
| 2008/0049584 A1 * | 2/2008 | Tan et al. ................. | 369/112.16 |
| 2008/0117789 A1 * | 5/2008 | Yokota et al. ............ | 369/112.01 |
| 2008/0186836 A1 * | 8/2008 | Tanaka et al. ........... | 369/112.24 |

FOREIGN PATENT DOCUMENTS

| | | |
|---|---|---|
| CN | 1281216 | 1/2001 |
| CN | 1811940 | 8/2006 |
| JP | 9-223327 | 8/1997 |
| JP | 10-064114 | 3/1998 |

* cited by examiner

*Primary Examiner* — Wayne R Young
*Assistant Examiner* — Linh T Nguyen
(74) *Attorney, Agent, or Firm* — Antonelli, Terry, Stout & Kraus, LLP.

(57) ABSTRACT

Provided are an optical pick up and an optical component used for the optical pickup which are capable of preventing or restraining occurrence of deviation and unbalance which are caused by assembly errors during manufacturing of optical components, a temperature variation or the like. The optical pickup comprises a laser, a polarization changeover element for changing over a direction of polarization of an optical beam emitted from the laser, a beam splitting element for splitting the laser beam into a plurality of optical paths in accordance with a direction of a polarization, a plurality of objective lenses for focusing laser beams onto a recording layer of the optical disc, a rise-up mirror, and a plurality of coupling lenses arranged respectively intermediate of the plurality of optical paths led to the plurality of objective lenses. The rise-up mirror is arranged intermediate of the plurality of optical paths led to the plurality of objective lenses and adapted to be used common to respective optical beams on the plurality of optical paths. The plurality of the coupling lenses are coupled to and held on one and the same drive portion.

8 Claims, 6 Drawing Sheets

OPTICAL DISC DRIVE, OPTICAL PICKUP AND OPTICAL COMPONENT USED THEREFOR

INCORPORATION BY REFERENCE

The present application claims priority from Japanese application JP2007-253036 filed on Sep. 28, 2007, the content of which is hereby incorporated by reference into this application.

BACKGROUND OF THE INVENTION

The present invention relates to an optical pick in an optical disc device, and an optical component used therefore, and in particular to a compatible optical pickup in an optical data recording device, which is capable of compatibly accepting not less than 2 standards.

As the standards of optical discs becomes more various, light sources for emitting not less than three light beams having different wavelengths (an infrared beam, a red beam and a blue beam and the like) are used, and demands for compatible optical pickups capable of accepting more various disc standards having been more and more increased on the market. The larger the number of wavelengths/standards, the more complicate the optical systems, and accordingly, the size of the pickups becomes larger, possibly resulting in difficulty in miniaturization of optical pickups.

In order to solve the above-mentioned problems, there has been proposed, for example, such a manner that a semiconductor laser serving as a light source is commonly used so as to lower the costs. As disclosed in JP-A-9-223327, a two standard compatible pickup which commonly uses a light source through polarization changeover has been proposed, as a compatible pickup structure capable of accepting two kinds of disc standards with the use of infrared ray.

Since the wavelengths of laser beams used for light sources have been less and less (from an infrared beam to a red beams and then to a blue beam), pickups capable of accepting not only two kinds but also more kinds of disc standards have been now demanded on the market.

Meanwhile, since it is necessary to maintain a satisfactory servo function, the number of objective lenses set on a single drive carriage is limited, and at present, the number of objective lens which can be set on one drive carriage is in general up to about two. In this case, since a single lens has to accept a plurality of wavelengths, a plurality of semiconductor lenses serving as light sources are used, and an optical path has to be split/synthesized on the way. However, if the optical path is split/synthesized, the optical axial angles are likely to be deviated among the optical axes (relative tilt angles), possibly resulting in asymmetric (unbalance) jitter characteristics of a pickup or occurrence of errors (in particular, tilt dependency). Further, the multiple wavelength compatible pickup as stated above, inevitably causes the optical system to be complicated, and accordingly cannot be small-sized.

Further, for high density optical discs with a blue beam light source, there have been manifested problems such that slight assembly errors of optical components would cause the characteristics to be remarkably unbalance, and the characteristic would be likely deteriorated due to aging effects/temperature variation.

As stated above, since the compatible optical pickup has a plurality of optical axes, if the degree of matching accuracy as to center positions/angles among the optical axes is not higher, deviations of relative tilt of the optical axes and uneven pickup characteristics (unbalance and asymmetry) would be likely caused.

BRIEF SUMMARY OF THE INVENTION

The present invention is devised in view of the above-mentioned affairs, and accordingly, an object of the present invention is to provide an optical pickup and optical components used therefor, which can reduce or eliminate occurrence of the above-mentioned deviations and unbalance of the optical components, caused by assembly errors of the optical components and temperature variations during the manufacture of the optical pickup.

The above-mentioned object can be achieved by the inventions stated in claims.

Brief explanation will be hereinbelow made of a typical one of the present inventions disclosed in the present application.

According to the present invention, there is provided an optical pickup comprising a laser, a polarization change-over element for changing over a direction of polarization of a laser beam emitted from the laser, a beam splitting element for splitting a laser beam into a plurality of optical paths in accordance with a direction of polarization, a plurality of objective lenses for focusing the laser beams onto a recording layer of an optical disc, a rise-up mirror and a plurality of coupling lenses which are arranged respectively on the plurality of optical paths on their ways extended toward the plurality of objective lenses. The rise-up mirror is arranged on the plurality of optical paths on their ways extended toward the plurality of objective lenses so as to be commonly used for the respective light beams on the plurality of optical paths. The plurality of coupling lenses are coupled and held on one and the same movable carriage.

According to the present invention, there can be provided optical pickups which can prevent or restrain occurrence of deviations of relative tilt of the optical axes, and which can have uniform characteristics.

According to the present invention, the optical pickup can prevent, as far as possible, occurrence of relative tilt angle of the optical axes and aberration caused by attachment errors (positions and angles) of components, and can materialize common use of components for a plurality of optical systems.

Other objects, features and advantages of the present invention will become apparent from the following description of the embodiments of the invention taken in conjunction with the accompanying drawings.

DETAILED DESCRIPTION OF THE INVENTION

Explanation will be made of embodiments 1 to 3 of the present invention with reference to FIGS. 1 to 12. Like reference numerals are in part used to denote like parts which exhibit like functions, throughout the drawings, for the sake of brevity for understanding the present invention.

Embodiment 1

(Optical System for Commonly Using Two Optical Axes)

Explanation will be hereinbelow made of examples of various configurations of optical pickups according to the present invention, in which a light beam is fed onto a plurality of objective lenses by changing over the light beam through polarization changeover, with reference to FIGS. 1 to 6 and FIG. 12.

Figure 2:
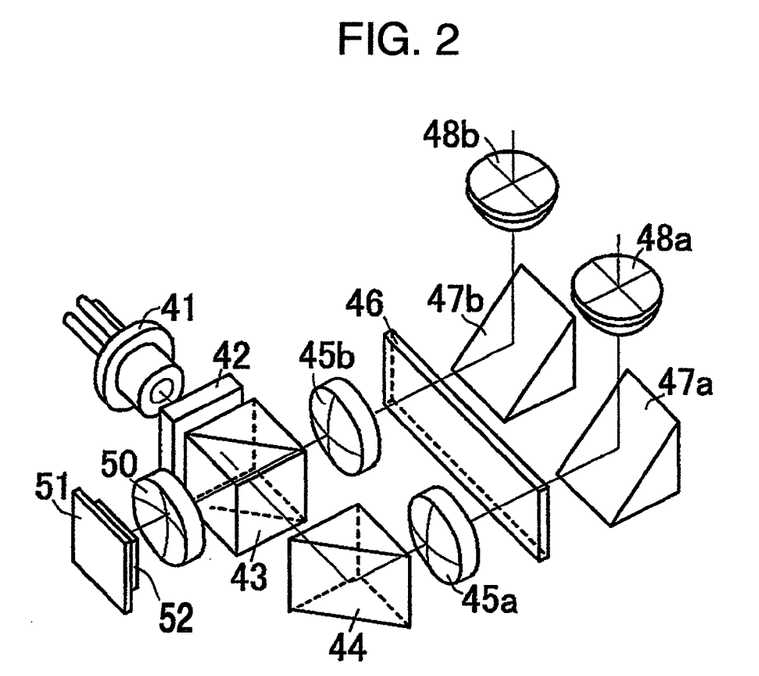
FIG. 2 is a view illustrating a comparison example for explaining the principle of the present invention.

At first, referring to FIG. 2 which shows a comparison example of a configuration, the comparison example of the configuration is a copy of a conventional configuration in part, and accordingly, the conventional configuration is only in part taken thereinto in order to readily understand the difference between the configuration of the present invention and that of the comparison example. In this configuration, a light beam emitted from a semiconductor laser 41 serving as a light source is split into two light beams on two optical paths by a polarization beam splitter 43 after the polarizing direction of the light beam is changed over by a polarization changeover element 42. The polarization changeover element 42 which is, for example, composed of a liquid crystal element interposed between electrodes in a specific form, changes over the polarizing direction of a beam transmitted therethrough, in dependence upon an applied voltage. A light beam transmitted through the polarization beam splitter 43 is reflected upon a triangular prism 44, being passed through a collimate lens 45a and a λ/4 plate 46, then is reflected upon a rise-up mirror 47a, and is irradiated onto a disc after being focused by an objective lens 48a. Meanwhile, a light beam reflected upon the polarization beam splitter is passed through a collimate lens 45b and a λ/4 plate 46, then is reflected upon a rise-up mirror 47b, and is irradiated onto the disc after being focused by an objective lend 48b. Incidentally, only one of the two collimate lenses 45a, 45b, which requires correction, is driven for an optical path onto an optical disc which requires a substrate thickness error correction, such as, for example, a blue-ray optical disc.

However, the configuration as stated above has caused an error due to the so-called relative tilt angle, that is, the angles of the optical axes of the light beams emerged from the objective lenses 48a, 48b are deviated from normal perpendicular directions so as to be directed in directions different from each other, due to errors in attaching angles of the polarization beam splitter 43, the triangular prism 44 and the rise-up mirrors 47a, 47b and errors in attachment (transverse deviation) of a drive mechanism for either one of the collimate lenses 45a, 45b. Upon occurrence of the relative tilt angle, there would be caused an asymmetric (unbalance) jitter characteristic and a tilt dependency in the optical pickup, resulting in deterioration of the characteristic of a reproduction signal from the disc. Further, the pick-up as mentioned above has been caused such a problem that the characteristic is likely deteriorated even by aging effect/temperature variation and the like.

Thus, according to the present invention, there is provided a configuration shown in FIG. 1, which will be hereinbelow explained.

In this configuration, the polarizing beam splitter and the triangular prism which have been conventionally separated from each other are integrally incorporated with each other so as to form a trapezoidal polarization beam splitter 6, the rise-up mirrors 47a, 47b are integrally incorporated with each other so as to form a rise-up mirror 47c, and the two collimate lenses 45a, 45b are coupled together by a lens drive mechanism so as to be both movable. Further, the optical axes of the two light beams (directed to the two objective lenses) after passed through the trapezoidal beam splitter 6 serving as an optical beam splitter, are both laid in parallel with the incident direction of the optical beam emitted from the laser as an optical source (in the same direction). Further, in view of this configuration, a detection lens 50 and a light receiving element 51 for guiding a signal light reflected from the disc are arranged in a direction perpendicular (90 deg.) to the incident direction. A half-mirror 52 is inserted between the detection lens 50 and the light receiving element 51, and accordingly, reproduction signals can be detected even by a light receiving element 53 exclusively used for reproduction signals. Advantages obtained by this configuration will be explained hereinbelow with reference to FIGS. 4A to 5B.

Figure 4A:
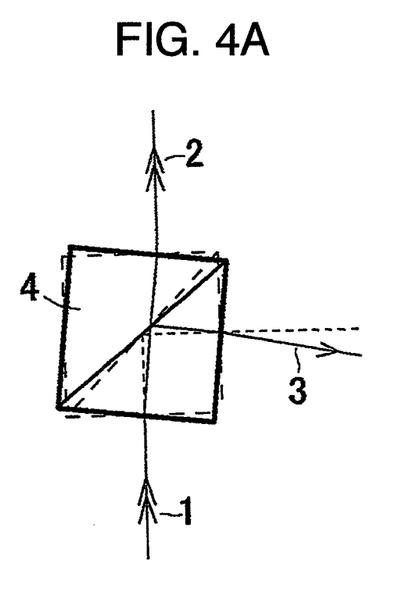
FIG. 4A and FIG. 4B are views for explaining a typical optical component and the characteristics of typical optical components.
Figure 4B:
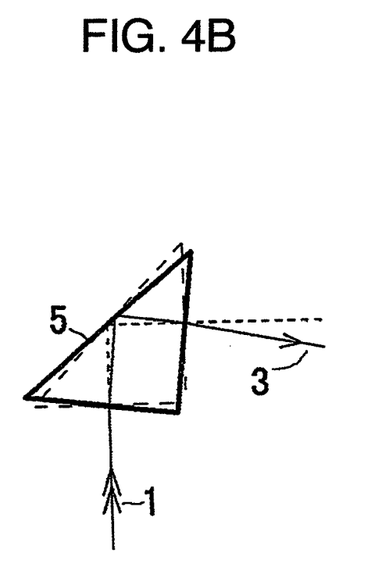

Referring FIGS. 4A and 4B which are view for explaining problems caused by the conventional configuration, in the case of using a square beam splitter 4 as a beam splitting element, as shown in FIG. 4A, when an incident light beam 1 is irradiated thereupon, a parallel emergent beam 2 has an optical axis whose direction is always in parallel with the incident light beam although the position of the center axis is slightly shifted, and accordingly, even though the beam splitter 4 is slightly rotated being caused by an assembly error thereof, it is completely directed in one and the same direction. However, the optical path of a perpendicularly emergent light beam 3 whose direction is bent being reflected by a reflecting surface by an angle of 90 deg. is shifted from 90 deg. being caused by the rotation of the beam splitter 4. Thus, the angles of the two light beams after being split vary, and the direction of only one of the optical beams varies after being emerged from the associated objective lens, resulting in occurrence of a relative tilt angle. This problem is also caused similarly in the case of using a triangular prim 5 as shown in FIG. 4B. That is, there would be possibly caused occurrence of a relative tilt angle caused by an assembly error in both polarization beam splitter 43 and triangular prism 44.

Figure 5A:
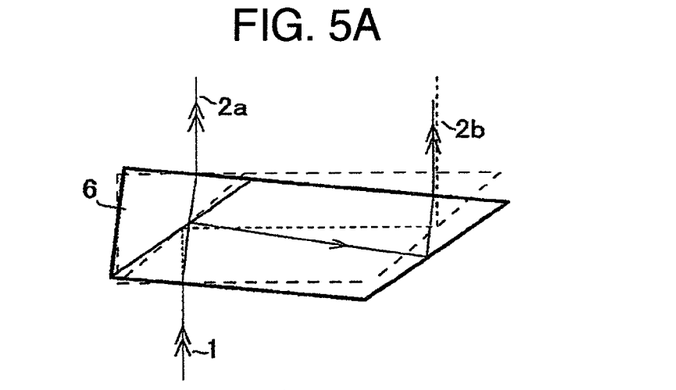
FIG. 5A and FIG. 5B are views for explaining a typical optical component and the characteristics of typical optical components used in the present invention.
Figure 5B:
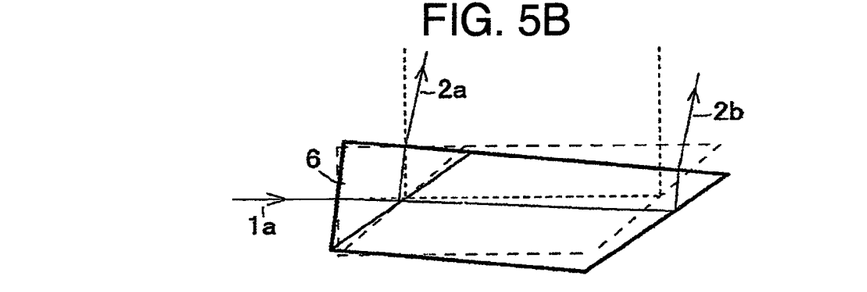

Thus, in the configuration of this embodiment, the integrally formed trapezoidal beam splitter 6 is used as shown in FIGS. 5A and 5B. With this configuration, as shown in FIG. 5A, both emergent light beams after beam-splitting become parallel light beams 2a, 2b in parallel with the incident light beam 1, and accordingly, do not cause occurrence of a relative tilt angle even though the trapezoidal beam splitter is rotated being caused by an assembly error. It can be found that an allowable assembly error is greatly alleviated in comparison with a configuration shown in FIG. 5B, in which the direction of an emergent light beam is perpendicular to an incident light 1*a*. Further, as found in FIG. 5A, the shift of the position of the center axis of the emergent optical beam 2*b* becomes relatively small in comparison with FIG. 5B. Since the shift of position of the center axial can be restrained, aberration of the optical beam emerged from the objective lens can be also restrained. Thus, the relative tilt angle and the intensity distributions of the light beams emerged from the objective lens are both improved in their accuracy of coincidence, and accordingly, it is found that the aberration thereof can be also improved. It is noted that the above-mentioned advantage can also be obtained not only in a parallel arrangement (0 deg.) but also in an anti-parallel arrangement (180 deg).

Figure 3:
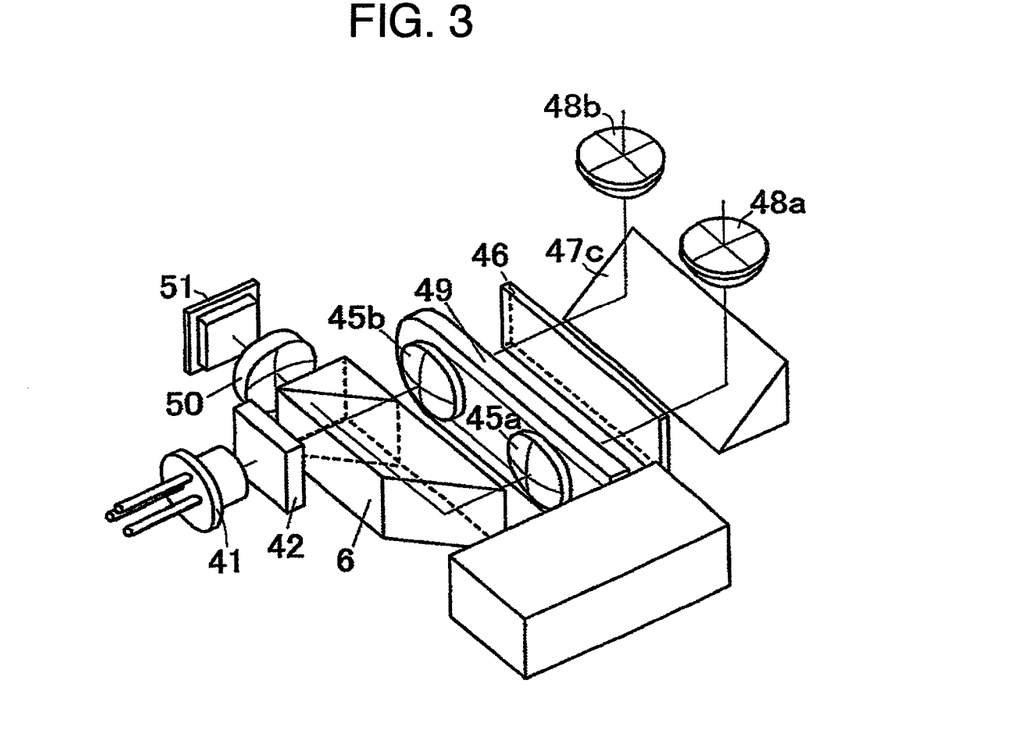
FIG. 3 is a view illustrating as an example of the configuration of an optical system according to the present invention.

Further, the collimate lenses 45*a*, 45*b* as shown in FIG. 3 are coupled to each other by a drive part 49 of a common drive mechanism so as to be moved together. The advantage obtained by this configuration will be explained with reference to FIGS. 6A and 6B.

Figure 6A:
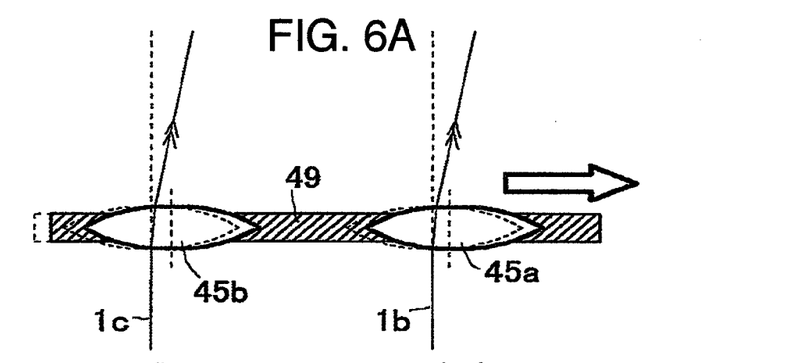
FIG. 6A and FIG. 6B are views for explaining a typical optical component and the characteristics of the typical optical components used in the present invention.
Figure 6B:
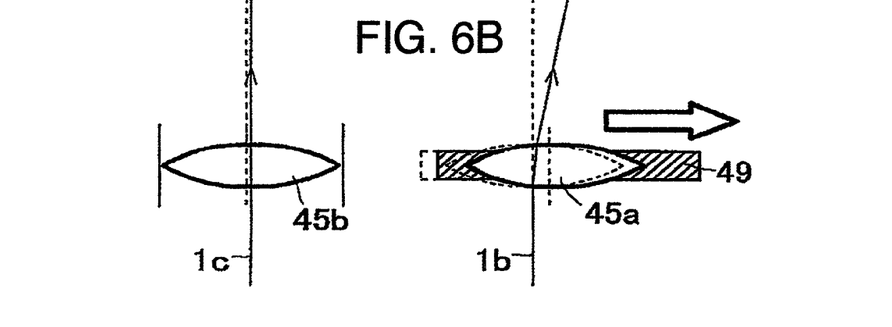

FIG. 6A shows such a case that the collimate lens drive for correction of spherical aberration is carried out for both two axial directions after splitting of the optical beam, and FIG. 6B shows such a case that it is carried out for either one of the directions. Since the correction for spherical aberration is required for correcting a substrate thickness error (cover layer thickness error) of a disc serving as a recording medium, in the case shown in FIG. 6B in which the lens drive mechanism is used for only one of the lenses, if an attaching angle error and an attaching position error are present, the drive portion 49 of the lens drive mechanism is shifted as shown in the figure, and accordingly, the center of the collimate lens 45*a* is shifted from the center of the incident light beam 1*b* so that the optical axis is inclined, and as a result, the two optical axes of the transmitted light beams causes a relative tilt angle therebetween. It is noted that the same result is caused even though the collimate lens 45*a* is fixed but the collimate lens 45*b* is solely moved. Meanwhile, in the case shown in FIG. 6A, both collimate lenses 45*a*, 45*b* are mechanically coupled to each other, and accordingly, the space between both collimate lenses is maintained to be constant. Even with the attaching angle error and the attachment position error of the lens drive mechanism, if the magnifications of both optical systems are substantially equal to each other, the optical axes of both incident lights are shifted similarly after transmission of the optical system, and accordingly, it is possible to prevent occurrence of a relative tilt angle. Even though the magnifications of the optical systems are different by 20 to 30% between the two optical axes, the shift can be restrained to one several in comparison with the case shown in FIG. 6B. Thus, even in such a case that both two axes are used for multiple layers, occurrence of a relative tilt angle can be prevented. It is noted the correction for spherical aberration can be made by driving either a collimate lens or a coupling lens, and accordingly, in this embodiment, any kind of lens is not specified.

Further, the rise-up mirrors 47*a*, 47*b* are integrally incorporated with each other (as indicated by 47*c*), and accordingly, the two light beams can be emerged from the objective lenses with their angles of the optical axes being maintained.

That is, by restraining occurrence of the relative tilt angle for the above-mentioned four components, all causes for occurrence of principal relative tilt angles can be settled, and accordingly, the final relative tilt angle (upon emergence from the objective lenses) can be restrained to a value which is substantially zero. The above-mentioned configuration in which occurrence of a relative tilt angle is restrained for every optical component is stable and reliable also with respect to temperature variation and aging effect.

That is, in this configuration in which a single light beam emitted from the one and same laser is changed over through polarization changeover so as to be led respectively to a plurality of objective lenses in an optical pickup, the integrally incorporated rise-up mirror is used common to a plurality of outgoing light beams (which is a common single reflector), and a plurality of lenses (coupling lenses and collimate lenses) which are inserted respectively in the light beams are coupled to and held on one and the same drive portion. Thus, even though the drive portion for holding the coupling lenses is fixed being positionally deviated, no relative tilt angle is caused between two optical axes. Since the space between two coupling lenses is maintained to be constant, values of deviations with respect to the two optical axes are maintained to be substantially equal to each other, and accordingly, the angles of the axes of the emitted light beams can be coincident with each other between the two axes. Further, since no relative tilt angle and no aberration are caused even though the beam splitter element and the rise-up mirror are rotated, it is possible to lower the accuracy of adjustment of rotation during assembly, and accordingly, the costs can be reduced. Further, since the off-centering of the optical axis can be minimized, the centers of the tilt characteristics become uniform, thereby it is possible to manufacture an optical pickup having a satisfactory property with a high degree of yield.

Further, since the accuracy of coincidence of the optical axes can be enhanced, a focal point on the light receiving surface of the light receiving element 53 exclusive for reproduction signals becomes small, and accordingly, the light receiving surface can have a decreased size. The smaller the size of the light receiving surface, the lower the affection caused by unfocused stray light from a different layer, noise particular in reproduction signals can be reduced in a multilayer recording medium (multilayer disc). It is noted that noise can be reduced through the detection of reproduction signals which are different from servo-signals, and accordingly, the light receiving element may have a light receiving surface which can accept a three spot process. Thus, the three spot process can be used for tracking detection by incorporating a diffraction grating for three spots, integral with the polarization changeover element 42.

Further, in this configuration in which the accuracy of coincidence of the optical axis can be enhanced, even though two kinds of objective lenses which are used for reproducing various kinds of recording media are displaced for correction of slight larger spherical aberration corresponding to a multilayer recording medium, for these kinds of the recoding medium, occurrence of a relative tilt angle caused by the displacement of the lenses can be prevented. In general, an N-layer medium requires a spherical aberration correction range corresponding to (N-1) interlayer spaces. A multilayer medium having not less than three layers, requires a spherical aberration correction range which is not less than twice as large as that of conventionally used two-layer mediums. For example, in the case of using a blue-ray beam having a wavelength of about 405 nm, no correction drive mechanism has been conventionally required only for a two-layer medium in such a case the numerical aperture (NA) is about 0.6 and the interlayer space is 50 μm. However, the correction drive for spherical abrasion is required for a recording medium having not less than three layers which causes spherical aberration having about ±0.1λ rms. Further, as to a multi-layer medium having not less than 3, the movable range of the coupling lens becomes larger, the larger the movable range, the higher the possibility of occurrence of off-centering of the optical axis due to inclination of the optical axis. In the case of occurrence or the relative tilt angle, there is no such an arrangement that the tilting of the optical axes can be set to zero for both axes during operation of the coupling lens drive mechanism (spherical aberration correction drive mechanism), resulting in high possibility of occurrence of errors. The present invention can prevent occurrence of both relative tilt angle and off-centering of the optical axis, and accordingly, the coupling lens drive mechanism can be adjusted so as to eliminate the tilting of the optical axis for both axes at the same time. In this embodiment, a movable range which can accept a medium having not less than 3 layers can be ensured. That is, this movable range is not less than 3 mm in the case of a typically driven lens having a focal distance f=20 mm although it is dependent upon a disc standard to be used.

Further, according to this configuration, in an optical pickup having a plurality of objective lenses, in which a laser beam emitted from one and the same laser is changed over through polarization changeover so as to be fed to the objective lenses, the emergent direction of either one of a plurality of outgoing light beams which are led to the plurality of objective lenses by means of the beam splitting element, is set to be parallel with the incident direction of the light beam emitted from the light source (0 deg. or 180 deg.), and the emergent direction of the incoming light led to the light receiving element is set to be perpendicular to the above-mentioned incident direction (90 deg.). In such a configuration that the incident/emergent beams are set to be in the same direction, the emergent optical axis angles can be set to be coincident with each other between two axes, and accordingly, no relative tilt angle and no aberration are caused between two optical axes on the outgoing paths, and the angles of the optical axes of the emergent light beams can be coincident with each other between two axes. Accordingly, the accuracy of rotation adjustment of the beam splitting element is moderated, and the off-centering of the optical axis can be minimized. Thus, even with a high-density optical disc having a restrict allowable error range as to the tilt characteristic, the centers of the tilt characteristic can be uniform, thereby it is possible to enhance the yield. There can be formed pickups having tilt characteristics with uniform centers, and having uniform characteristics for reproduction of various standard discs. Even though the beam splitting element is rotated, the off-centering of the optical axis can be minimized, and accordingly, the occurrence of aberration can be restrained. Further, on the incoming path, the reverse optical path shown in FIG. 5B is taken so that only the center positions of the two optical axes can be displaced in parallel while two optical axes are maintained to be in parallel, and accordingly, the alignment for the focus points of the two optical axes on the OEICs can be adjusted by a an angle of rotation of the optical beam splitter. Since substantially no aberration occurs on the outgoing path even though the beam splitting element is rotated (even though slight aberration occurs on the incoming path, the characteristic is not appreciably deteriorated), an error in the space between the two axes, which is caused by assembly errors of components can be adjusted by a rotating angle of the trapezoidal polarization beam splitter 6 serving as the beam splitting element. The relative deviation of intensity distribution between the two axes can be adjusted within a certain range by rotating the trapezoidal prism. Thus, the adjustment can be made intermediate between the supreme characteristics of both optical axes, thereby it is possible to enhance the yield while the light receiving element is commonly used.

Further, in this configuration, a liquid crystal polarization changeover element is used so as to eliminate the necessity of a mechanical change-over drive portion, that is, the positions of optical components are not changed upon the changeover, thereby it is possible to further reduce oscillation of the optical axis in combination of the above-mentioned configuration.

Figure 1:
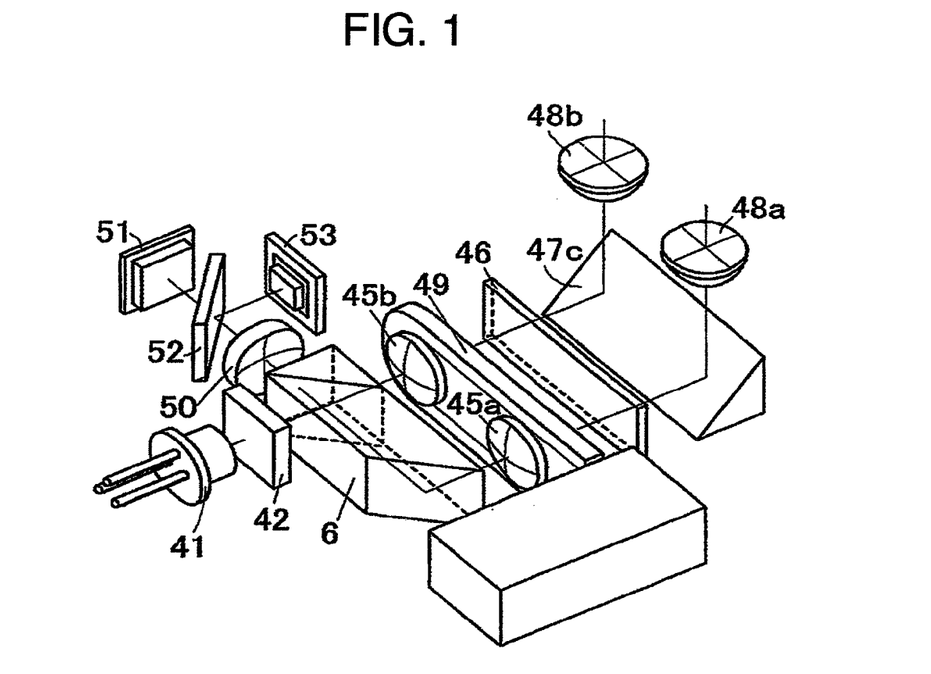
FIG. 1 is a view illustrating, as an example, the configuration of an optical system according to the present invention.

Further, the configuration shown in FIG. 1 can be applied not only in the case in which the beam splitting element is a polarization beam splitter but also in the case in which it is a usual beam splitter incorporating a reflection surface serving as a reflector. The advantages obtained in these cases are also common, except the portions relating to the polarization. The angles of the emergent optical axes can be made to be coincident with each other between the two axes, and further, no relative tilt angle and no aberration are caused even through the beam splitting element or the rise-up mirror is rotated. Thus, the accuracy of rotation adjustment during assembly can be moderated. Such advantages that the centers of the tilt characteristics are uniform and so forth are similar in the case of the above-mentioned beam splitter incorporating the reflection surface of the reflector.

It is noted that, for example, the configuration shown FIG. 3 may be used, instead of the configuration shown in FIG. 1. That is, as shown in FIG. 3, the optical pickup can be constituted without the half mirror 52 and the light receiving element 53 exclusive for reproduction signals shown in FIG. 1.

Figure 12:
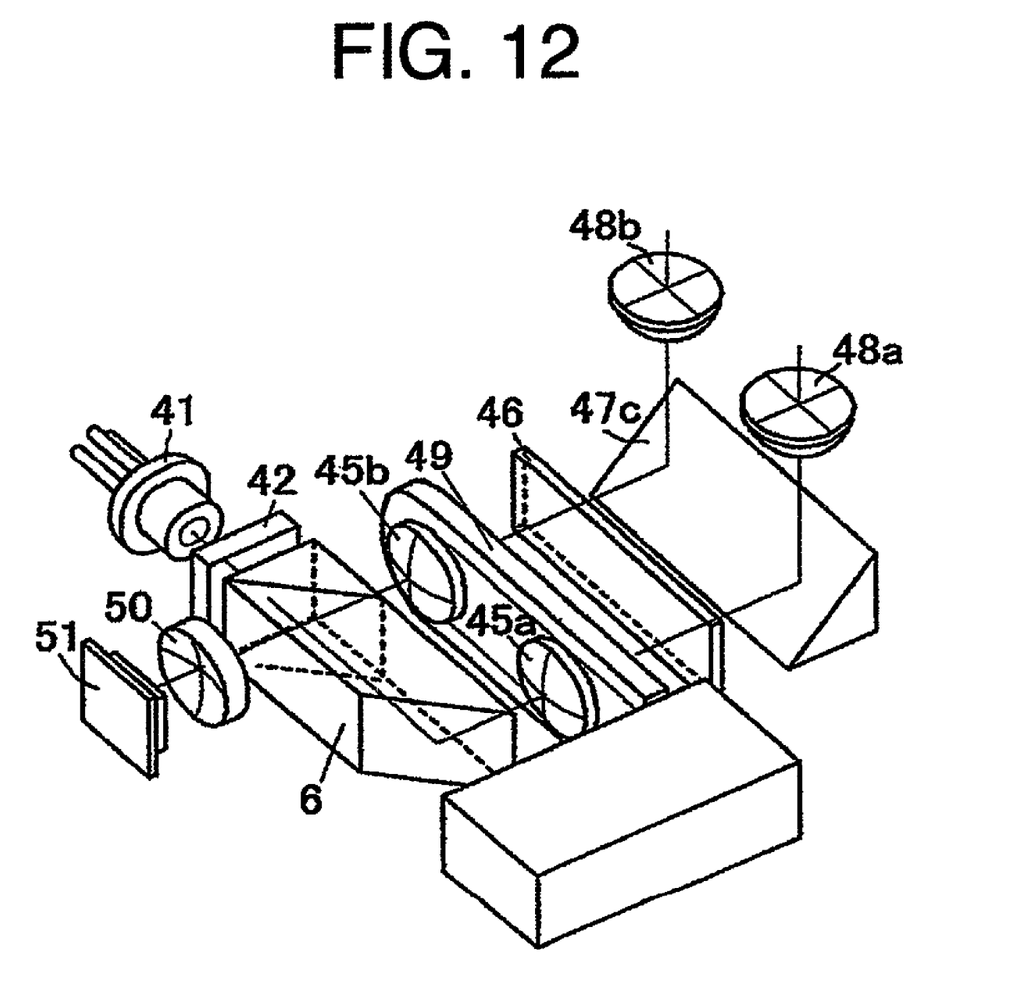
FIG. 12 is a view illustrating an example of the configuration of an optical system according to the present invention.

It is noted, in the case in which the beam splitting element is a polarization beam splitter, a peculiar advantage can be exhibited during reproduction of a disc recording medium incorporating address marks by, for example, pits even though the following configuration shown in FIG. 12 is used.

Referring to FIG. 12 which shows such a configuration that the positions of the semiconductor laser 41 and the light receiving element 51 are replaced with each other in the configuration shown in FIG. 3, the emergent direction of the outgoing light beam led through the beam splitting element and to the objective lens, is perpendicular to the incident direction of the light beam as to either one of the two optical axes. It is noted that, as to the incoming optical path, the emergent direction of the light beam directed to the light receiving element is parallel with the incident direction of the light beam returned from the objective lens (0 deg. or 180 deg.). In the case of using a polarization optical system, different phase differences are likely caused with respect to different directions of polarization when the light beam reflects upon an internal surface of a prism, and accordingly, the polarization would be disturbed, resulting in distortion of reproduction signals. In the case of using the one and the same component between two axes, if a phase difference at either one of the optical axes cannot be cancelled out, that is, it remains still, the polarization of the light beam emerged from the objective lens is rotated or becomes an elliptically polarized beam, resulting in such an inferior condition that servo signals are disturbed during reproduction. For example, during reproduction of a disc recording medium incorporating address marks by pits, there would be caused such an inferior condition that servo signals and reproduction signals are disordered by the disturbed polarized light beam. Accordingly, it is important to allow the number of times of reflection within the prism to be uniform since a large phase difference is likely caused.

In such a case that the emergent direction of the outgoing path is set to be perpendicular to the incident direction (90 deg.), the above-mentioned problem can be easily eliminated. Specifically, when the light beam emitted from the laser is reflected upon the internal surfaces of the beam splitting element so as to be directed to the objective lens, the number of times of reflection within the beam splitting element is different between the two optical axis, that is, 0 and 2 in the case of the configuration shown in FIG. 1, in which the incident/emergent directions are in parallel with each other, but the number of times of reflection is one even both cases, that is, the light beam travels on either of the two optical axes, in the case of the configuration shown in FIG. 12 in which the incident and emergent directions are perpendicular to each other. In other words, the number of times is equal between the two optical axes. By setting the number of times of reflection to the same value, the degrees of occurrence of phase differences can be set to be coincident with each other, that is, nearly equal to each other, between two axes. Since the phase differences are made to be uniform, even though the components are commonly used between the two axes, the light beams emergent from the objective lenses can be both adjusted so as to have clear true-circularly polarized light beams at the same time by suitably designing the components. Since the polarization characteristics are uniform, it is possible to minimize occurrence of uneven events on optical signals, which are caused by a structure of a disc.

That is, in this configuration, in the optical pickup having a plurality of objective lenses, and having such a configuration that the beam splitting element serves also as a polarization beam splitter, and the light beam emitted from one and the same laser is changed over through polarization changeover, either one of the plurality of optical paths which are emergent from the beam splitting element and which are directed to the plurality of objective lenses is set to be perpendicular to the incident direction of the light beam emitted from the light source (90 deg.). Thus, the number of times of reflection of the light beam within the beam splitting element can be coincident with each other between two axes, and the degrees of occurrence of phase differences upon reflection can be coincident with each other between the two axes. Even though the commonly used component is used, the polarization characteristic is uniform between two axes, it is possible to minimize disturbance of servo signals and reproduction signals caused by a disc structure.

Embodiment 2

(Combination with Red Color Optical System)

Next, explanation will be made of an example of the embodiment of the optical system in the optical pickup compatible among multiple standards, according to the present invention with reference to FIGS. 7 to 10.

Figure 8:
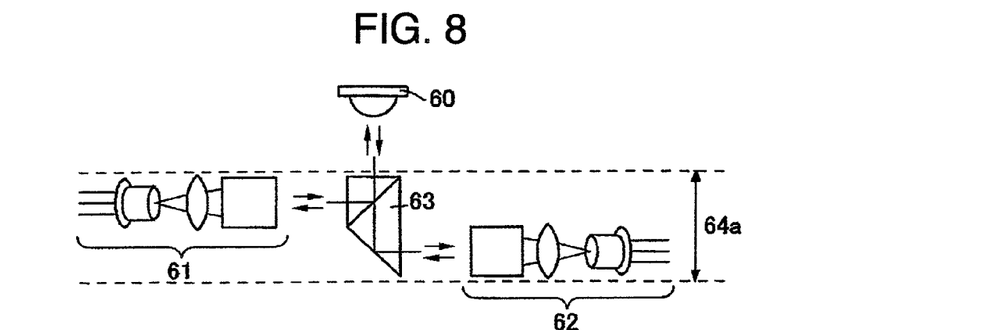
FIG. 8 is a view illustrating a comparison example for explaining the principle of the present invention.
Figure 9:
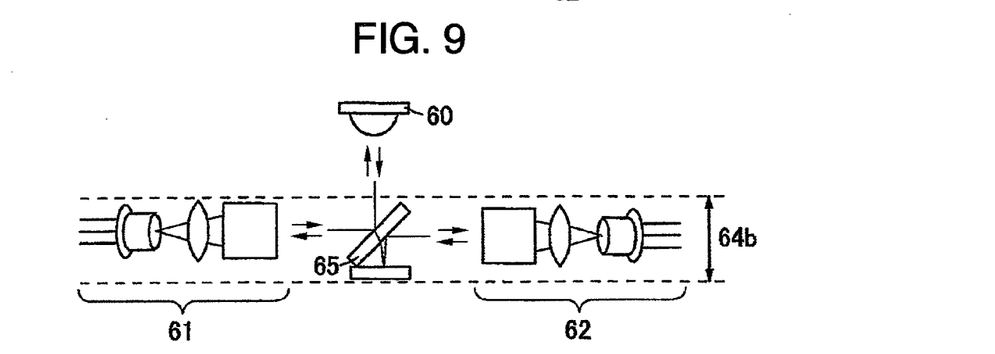
FIG. 9 is a view illustrating a positional configuration of an optical system according to the present invention.

At first, the configuration according to the present invention will be explained with reference to FIGS. 8 to 10. FIG. 8 shows a comparison example of a configuration which is a copy, in part, of a conventional configuration and in which a part of the conventional configuration is used in order to facilitate the understanding of difference between the present invention and itself. It is noted that this pick-up is configured so that the pickup itself alone can reproduce two kinds of recording mediums (discs) which utilize blue light, and red light or infrared. The optical system for blue light and the optical system for red or infrared light beam will be referred to as "blue light optical system" and "red light optical system", respectively.

As shown in FIG. 8, in the comparison example, the blue light optical system 61 and the red light optical system 62 are arranged on opposite sides, the object lens 60 being interposed therebetween. In this figure, in the case of splitting a light beam into the blue light optical system and the red light optical system with the use of a trapezoidal prism 63, the pickup has to have two story structure, that is, the height 64a of the pickup becomes high, and as a result, the pickup becomes thicker in its entirety.

Accordingly, instead of the trapezoidal prism 63, a structure in which a reflector and a wavelength plate are combined with each other is used. The structure 65 in combination of a reflector and a wavelength plate will be explained in detail with reference to FIGS. 10A, 10B and 10C.

Figure 10A:
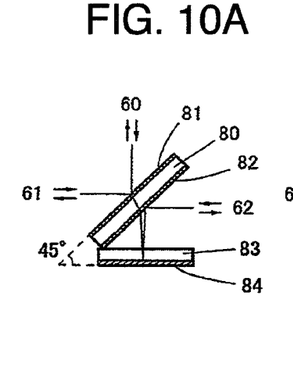
FIG. 10A, FIG. 10B and FIG. 10C are views illustrating typical configurations of combination of optical components.
Figure 10B:
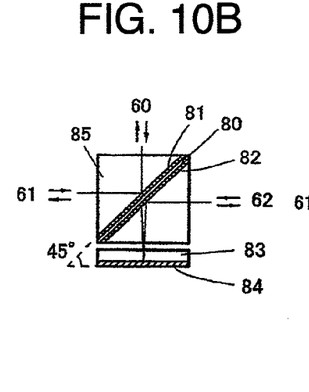
Figure 10C:
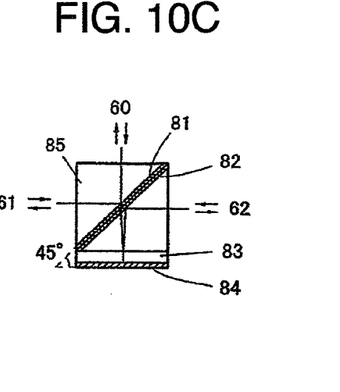

FIGS. 10A, 10B and 10C show specific examples of a configuration in the interior of the structure in combination of a reflector and a wavelength plate.

Referring, at first, to FIG. 10A which shows a configuration in combination of a compound reflector and a $\lambda/4$ plate with a reflection surface. The compound reflector is formed of a glass plate coated over its one surface with a dichroic mirror film 81 and over it's the other surface with a PBS mirror film 82. The $\lambda/4$ plate with a reflection surface is coated over its rear surface with a non-polarization mirror film 84. The compound reflector and the $\lambda/4$ plate are arranged, making an angle of 45 deg. therebetween as shown in FIG. 10A. A blue light beam emergent from the blue light optical system is incident upon the thus configured structure in combination of the reflector and the wavelength plate, and is then led toward the objective lens 60 after being reflected upon the dichroic mirror film 81. Then it is reflected upon a recoding medium, then being passed through the objective lens 60, is led to the blue light optical system 61 on the left side, at once after being reflected by the dichroic mirror film 81.

Meanwhile, a light beam emerged from the red light optical system 62 is reflected upon the PBS mirror film 82. The direction of polarization of the light beam emergent from the red light optical system 62 is adjusted so as to be reflected upon the PBS mirror film 82. The light beam emerged from the red light optical system is passed through the $\lambda/4$ plate 83, then reflected upon the non-polarization mirror film 84, and is again passed through the $\lambda/4$ plate 83. At this time, since the direction of the polarization of the light beam emerged from the red light optical system has been turned by an angle of 90 deg., the light beam is passed through both PBS mirror film 82 and the dichroic mirror film 81, and is then led to the recording medium through the intermediary of the objective lens 60. Then it is reflected upon the recording medium so as to be turned into a return light beam passing through the objective lens 60. Then, the return light beam is passed through both dichroic mirror film 81 and PBS mirror film 82, also through the $\lambda/4$ plate 83, then being reflected upon the nonpolarization mirror film 84, and the direction of polarization thereof is turned by an angle of 90 deg. at the time when it is passed again through the $\lambda/4$ plate 83. Thus, it is rightward reflected upon the PBS mirror film 82 at this time, and is led into the red light optical system 62.

Referring to FIG. 10B which shows a configuration in which a prism is used as the compound reflector, that is, a glass members 85 made of a prism material are arranged being opposed to each other, instead of the glass plate 80 in the configuration shown in FIG. 10a, the glass plate 80 between the dichroic mirror film 81 and the PBS mirror film is extremely thin, or may be neglected. Since no glass plate 80 obliquely inserted is present, there can be offered such an advantage that no astigmatism and no coma aberration are caused even though the prism is inserted in converging/diverging light beams.

Referring to FIG. 10C which shows a configuration in which the prism and the $\lambda/4$ plate are integrally incorporated with each other, since the prism and the nonpolarization mirror film 84 on the $\lambda/4$ plate can be maintained to be in parallel, the optical axis directed to the blue light optical system 61 and the optical axis directed to the red light optical system 62 can be prevented from being angularly deviated.

With the use of the structures in combination of the mirror and the wavelength plate as shown in FIGS. 10A, 10B and 10C, the blue light optical system 61 and the red optical system 62 can be arranged substantially at the equal height. Thus, the height 64b of the pickup can be set to be low, thereby it is possible to provide a compact optical pickup.

Referring again to FIG. 7 which shows such a configuration that the mirror and the wavelength plate are used in combination, corresponding to FIG. 10A, with the use of the compound reflector 54 and the λ/4 plate 55 with a reflection surface, the blue light optical system in the left half part is separated from the red light optical system in the right half part.

Figure 7:
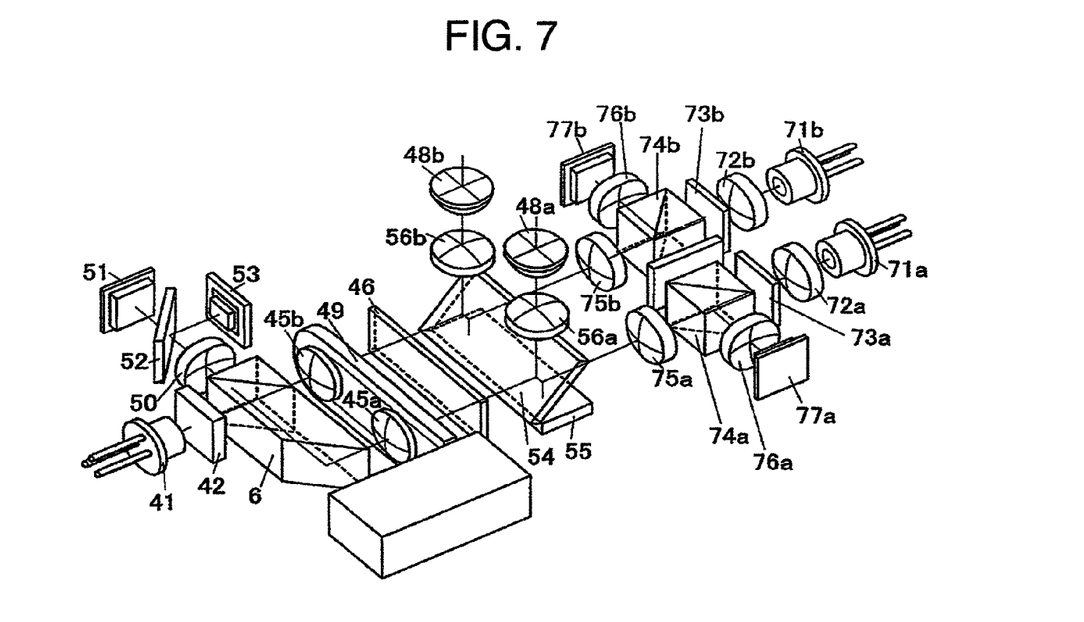
FIG. 7 is an example of the configuration of an optical system according to the present invention.

At first, the blue light optical system will be explained. A light beam emitted from the semiconductor laser 41 is passed through the polarization changeover element 42, and is then incident upon the trapezoidal polarization beam splitter 6 serving as a light beam splitting element, in which transmission/reflection at a 45 deg. reflection surface is determined, depending upon a direction of polarization. The light beam transmitted through the 45 deg. reflection surface in the trapezoidal polarization beam splitter 6 is directed to the collimate lens 45b as it is. Meanwhile, the beam reflected upon the 45 deg. reflection surface in the trapezoidal polarization beam splitter 6 is directed to the collimate lens 45a.

The collimate lenses 45a, 45b are coupled to and held on a drive portion 49 of a lens drive mechanism, and the drive portion 49 can be moved in the direction of the optical axis by a stepping motor. The light beams having passed through the collimate lenses 45a, 45b are transmitted through a λ/4 plate 46, being reflected upon a compound reflector 54 and then being passed through coupling lenses 56a, 56b, and are emerged from objective lenses 48a, 48b.

Reproduction signal beams reflected from a recording medium are again passed through the objective lenses 48a, 48b, the coupling lenses 56a, 56b, and are reflected upon the compound reflector 54. Then, they are passed through the λ/4 plate 46 and the collimate lenses 45a, 45b, and are incident upon the trapezoidal polarization beam splitter 6. At this stage, the light beams which have been twice transmitted through the λ/4 plate 46, rotate their polarization by an angle of 90 deg., and accordingly, at this time, the light beam which has been passed through the collimate lens 45a is transmitted through the trapezoidal polarization beam splitter 6 while the light beam which has been transmitted through the collimate lens 45b is reflected by the trapezoidal polarization beam splitter 6. Thereafter, both light beams are directed to the detection lens 50.

The light beams having passed through the detection lens 50, are detected on a detection surface on a light receiving element 51 so as to be converted into electric signals. It is noted that as to a blue light beam, a signal/noise ratio (S/N ratio) in a reproduction signal is insufficient, and accordingly, the light beam is split in part by a half-mirror 52 so as to obtain a reproduction signal light beam which is detected by a detector 53 exclusive for reproduction signals, thereby it is possible to obtain the reproduction signal light beam with a high signal/noise ratio.

Next, explanation will be made of the red color optical system. Light beams emitted from semiconductor lasers 71a, 71b are passed through auxiliary lenses 72a, 72b, three spot gratings 73a, 73b for three spot processes, the beam splitters 74a, 74b and collimate lenses 75a, 75b and are then irradiated onto the compound reflector 54. At this stage, the light beams to be irradiated, are adjusted so that they are not completely parallel ray light beams but slightly converged and diverged light beams. The irradiated light beams are once reflected upon the compound reflector 54, and are then reflected upon a λ/4 plate 55 with a reflection surface so as to rotate their polarization by an angle of 90 deg. Thereafter, they are passed through the compound reflector 54 at this time, then being transmitted through coupling lenses 56a, 56b and the compound reflector 54, and are emerged from the objective lenses 48a, 48b. Reproduction signal light beams reflected from a recording medium are again transmitted through the objective lenses 48a, 48b, the coupling lenses 56a, 56b, then being transmitted once through the compound reflector 54, and are reflected upon the λ/4 plate 55 with a reflection surface so as to rotate their polarization by an angle of 90 deg. Thereafter, they are reflected at this time upon the compound reflector 54, then being passed through the collimate lenses 75a, 75b, and are reflected upon the beam splitters 74a, 74b. Thereafter, they are passed through the detection lenses 76a, 76b, and are detected by the light receiving elements 77a, 77b.

Thus, with the use of the two objective lenses 48a, 48b and the blue light beam, the red light beam and the infrared light beam, only one optical pickup can accept not less than four kinds of standard discs.

In this configuration, the blue light optical system and the red light optical system can be arranged at a substantially equal height, and accordingly, in comparison with the two story structure as shown in FIG. 8, the height of the pickup can be decreased, that is, a compact pickup can be provided. Further, in the example of the configuration shown in FIG. 7, in particular, the angle of the overall blue light optical system and the angle of the overall red light optical system can be adjusted respectively by the compound reflector 54 and the λ/4 plate 55 with a reflection surface, independent from each other, and accordingly, the degree of freedom of adjustment in fabrication can be enhanced.

That is, in this configuration, there is used the structure in combination of a mirror and a wavelength plate, in which the dichroic mirror film, the PBS mirror film, the λ/4 plate, and a nonpolarization mirror film are arranged on the straight in the mentioned order while the dichroich mirror film and the PBS mirror film are formed in parallel with each other on the integral optical element, making an angle of 45 deg. with respect to the nonpolarization mirror film. With the use of this configuration, two optical systems for different wavelengths, can be configured so as to split the light beam into two beams on opposite sides of the structure in combination of a mirror and a wavelength plate, interposed therebeween, and further, the height difference of the two optical systems can be decreased, thereby it is possible to provide an optical pickup which is compact in its entirety.

Further, in this configuration, there is used the structure in combination of a mirror and a wavelength plate, in which the dichroic mirror film, the PBS mirror film, the 1/λ plate and the nonpolarization mirror film are formed on the integral optical element. With the use of this configuration, it is possible to prevent an angular error of the optical axis from being caused due to such a fact the dichroic mirror film and the PBS mirror film are shifted from the nonpolarization mirror film by an angle of 45 deg. Further, since the mirrors are integrally incorporated with one another, the height of the pickup unit can be further decreased, that is, a thinner pickup can be formed.

Further, in this configuration, the structure in combination of a mirror and a wavelength plate is arranged along the row of the objective lenses, that is, the optical pickup has such a configuration that the structure can be used, common to a plurality of objective lenses. With the use of this configuration, for the optical axes of all light beams which are incident upon the plurality of objective lenses, the angles of the optical axes can be coincident with one another at the same time. Thereby it is possible to manufacture pickups having characteristics (tilt characteristics) which are uniform for all kinds of standard recording mediums (discs) at the same time.

Further, in this configuration, with the use of the structure in combination of a mirror and a wavelength plate, there can be provided such an optical pickup that light beams passed through the above-mentioned wavelength plate become converged and diverged beams. In the case of multi-reflection of the converged and diverged light beams, the multi-reflection light beams are incident upon the objective lenses with different path lengths, and accordingly, the focal distances are apparently different from each other. However, with the use of the above-mentioned configuration, differences between the focal distances can be effectively used so as to reduce affection by return light of unnecessary light which is reflected several times among optical components and is finally returned to the light receiving element.

Namely, in this configuration, there is provided an optical pickup in which optical beams led to the blue light optical system and the red light optical system can be synthesized with the use of the structure in combination of a mirror and a wavelength plate in which the dichroic mirror film and the PBS mirror film are formed in parallel with each other on the integral optical element, making an angle of 45 deg., with respect to the λ/4 plate and the nopolarization mirror film, and which is arranged below the objective lenses.

With the use of the configuration, the blue light optical system and the red light optical system can be separated from each other (in opposite directions with respect to the objective lenses) with no use of a two story structure. That is, the light beams can be separated from each other on opposite sides of the objective lenses interposed therebetween, and further, the height difference can be decreased. Since a single story structure can be used, a thin pickup can be formed.

Embodiment 3

(Overall Configuration of Data Reproduction Device)

Figure 11:
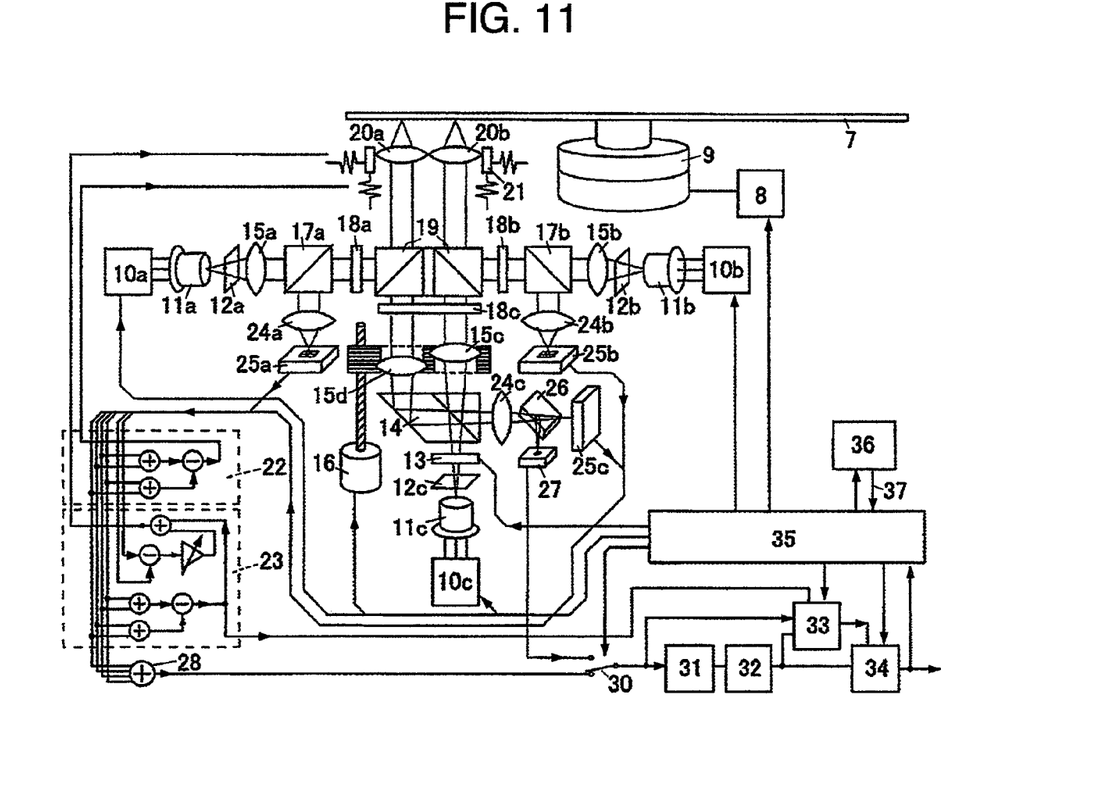
FIG. 11 is a view illustrating an example of the overall configuration of the optical data reproducing drive according to the present invention.

Next, one of various embodiments of the overall configuration of a data reproduction device according to the present invention will be explained with reference to FIG. 11 as an example.

An optical disc serving as a recording medium is mounted on a motor 9 whose speed is controlled by a rotational servo circuit 8. Light beams emitted from semiconductor lasers 11a, 11b, 11c which are energized by a laser drive circuit 10 are irradiated onto the medium. The semiconductor lasers 11a, 11b, 11c emit laser beams having wavelengths different from one another, that is, they are an infrared semiconductor laser 11a, a red light semiconductor laser 11b and a blue light semiconductor laser 11c, respectively.

Light beams from the infrared and red light semiconductor lasers 11a, 11b are passed through gratings 12a, 12b for three spot processes, collimate lenses 15a, 15b, beam splitters 17a, 17b, λ/4 plates 18a, 18b, then being reflected by beam splitters 19a, 19b, and are focused by objective lenses 20a, 20b so as to be irradiated onto the optical disc 7 serving as a recording medium.

The objective lenses 20a, 20b are mounted on an actuator 21 and accordingly, they can be driven so that their focal points are moved respectively in a direction of focal depth by a signal from a focus servo circuit 22 and in a track direction by a signal from a tracking servo circuit 23. In the example shown in FIG. 11, the objective lens 20a is compatible among CD, HD, and DVD, and the objective lens 20b is compatible between DVD and BD.

The light beams irradiated are in part reflected by the optical disc 7, then being passed again through the objective lenses 20a, 20b, and are reflected by the beam splitters 19a, 19b. Thereafter, they are reflected upon the beam splitters 17a, 17b, then being passed at this time through detection lenses 24a, 24b, and are detected by detection surfaces on the light receiving elements 25a, 25b by which they are converted into electrical signals. Although FIG. 11 shows such a configuration that the beam splitters 19a, 19b are separated from each other, they can be integrally incorporated with each other, similar to the compound reflector 54 and the λ/4 plate 55 with a reflection surface as shown in FIG. 7.

The light beam from the blue light semiconductor lens 11c is passed through the grating 12c for a three spot process, then being passed through a polarization changeover element 13 for controlling the direction of polarization, and is incident upon a trapezoidal polarization beam splitter 14 in which transmission/reflection at an 45 deg. reflection surface is determined depending upon a direction of polarization. A light beam transmitted through the 45 deg. reflection surface in the polarization beam splitter 14 is directed to a collimate lens 15c as it is. Meanwhile, a light beam reflected upon the 45 deg. reflection surface in the polarization beam splitter 14 is directed to a collimate lens 15d. The collimate lenses 15c, 15d are coupled to and held on a drive portion of a lens drive mechanism, the drive portion being movable in a direction parallel with the optical axes, by means of a stepping motor 16.

The light beams having passed through the collimate lenses 15a, 15d, are passed through a λ/4 plate 18c and the beam splitters 19a, 19b, and are focused by the objective lenses 20b, 20 so as to be irradiated onto the optical disc 7 serving as a recording medium. The irradiated light beams irradiated are in part reflected by the disc 7, again being passed through the objective lenses 20a, 20b, the beam splitters 19a, 19b and the λ/4 plate 18c and the collimate lenses 15ac, 15d, and are incident upon the trapezoidal beam splitter 14. At this stage, since the polarizations of the optical beams are rotated by an angle of 90 deg., that is, since they are passed twice through the λ/4 plate 18c, at this time, the light beam passed through the collimate lens 15c is passed through the polarization beam splitter 14 while the light beam passed through the collimate lens 15c is reflected upon the polarization beam splitter 14, and then both light beams are directed to the detection lens 24c. The light beams having passed through the detection lens 24c are detected on a detection surface on a light receiving element 25c which coverts them into electric signals. It is noted that a blue light beam causes a signal/noise ratio (S/N ratio) in a reproduction signal to be insufficient, and accordingly, a half mirror 26 is inserted between the detection lens 24c and the light receiving element 25c, and further, a detector 27 for a reproduction signal having a high S/N ratio is added.

The electrical signals obtained from the light receiving elements 25a, 25b, 25c are amplified by photocurrent amplifiers provided respectively in the light receiving elements, and are subjected to addition and subtraction so as to produce a focus error signal from a focus error signal producing circuit 22, a tracking error signal from a tracking error signal producing circuit 23 and a reproduction signal (RF signal) from an adder 28. It is noted that quadrant optical detector is used as the receiving surface on the light receiving element 25 so as to detect a focus error signal through an astigmatic process. Further, in view this matter, compound lenses each composed of a concave lens and a cylindrical lens are used as the detection lenses 24a, 24b.

The reproduction signal are led through an equivalent circuit 31, a level detection circuit 32 and a synchronizing clock producing circuit 33, and are then converted into a digital signal which has been originally recorded. Further, at the same time, the synchronizing clock producing circuit 33 directly detects a synthesized reproduction signal so as to produce a synchronizing signal which is then fed to a decoding circuit 34. These circuits in series are supervised by a main control circuit 35.

A nonvolatile memory element 36 is mounted on the pickup (movable part) and is connected to the main control circuit 35 through the intermediary of a data read-out line 37. The nonvolatile memory element 36 stores therein information inherent to the pickup, which includes initial positions of the stepping motor 16 corresponding to a various kinds of standard discs, drive conditions of the semiconductor lasers 14, tilt angles of optical axes, sensitivity ratios between light receiving elements 25 and reproduction signal detectors 27, signal mixing ratios (k-values) used in the tracking error signal producing circuit 22 and the tracking error signal reproducing signal 23. Thus, the time necessary for initial adjustment (learning) in the data reproduction device (optical disc unit) can be shortened, thereby it is possible to start the data reproduction device at a high speed.

The overall optical system incorporates therein an adjusting mechanism for adjusting a mounting angle of the disc 7 held by the motor 9. With this configuration, in the pickup optical system, even though errors in perpendicular emergence of the optical axis still remain, if the angles of the directions of emergent light beams are uniform among all optical axes (if the relative tilt angle is zero), an error in the vertical emergence of the optical axis which remains finally can be cancelled out so as to be substantially zero by attaching the overall pickup on the drive unit in an inclined posture.

That is, in this configuration, by adding a mechanism with which the optical pickup explained in the embodiment 1 can be attached to the drive unit, the inclination thereof being adjusted, and accordingly, an error in perpendicular emergence of the optical axis which finally remains in the pickup unit can cancelled out in a substantially complete manner. Thus, unbalancing of the tilt characteristic of the overall drive unit (data reproduction device) can be eliminated, thereby it is possible to satisfy both reproduction characteristic and recording characteristic, and to enhance the yield as a whole.

Further, in this configuration, and in particular an optical pick up and a drive unit (data reproduction device) which utilizes not only a single wave light source but also a multiple wave light source, with the use of an optical pickup incorporating therein the structure in combination of a reflector and a wavelength plate stated in the embodiment 2, the overall drive unit (data reproduction device) can be thinned and the number of component can be reduced while occurrence of a relative tilt angle can be restrained. Thus, even with a drive unit which is compatible among several standards, the reproduction of data can be made with a high degree of reliability while the yield can be enhanced, thereby it is possible to reduce the costs.

It is noted that a blue light signal can be selected between the RF signal from the light receiving element 25c and the signal (exclusive RF signal) from the reproduction signal detector 28. For this purpose, there is provided a reproduction signal changeover means 30. The reproduction signal detector 28 is a light receiver having an exclusive light receiving surface for receiving the RF signal, and since the number of initial stage photoelectric current amplifiers for amplifying the RF signal can be decreased to one, a satisfactory reproduction signal having a high signal/noise ratio with less noise can be obtained. Further, it is independent from servo system light receiving elements, there may be used an AC amplifier with less noise or an amplifier composed of a compound semiconductor transistor may be used. Thus, reliable and stable decoding can be made even with a high rate. Further, since a light beam which is never affected by astigmatism, independent from servo system light receiving elements, can be received by the exclusive light receiving surface, the size of a spot on the light receiving surface can be reduced, and since stray light coming from a different layer can be reduced as possible as it can during reproduction of a multilayer recording medium, a reproduction signal having a higher S/N ratio can be obtained during reproduction of a multilayer recording medium having in particular not less than three layers, in which stray light possibly comes from both two layers fore and after.

Namely, in this configuration, in a multi-standard compatible drive unit in which a plurality of optical paths and a plurality of objective lenses are used being changed over through polarization changeover, even in such a case that reproduction signals having a high S/N ratio are required, being obtained from one and the same light source wave, at the same time for recording mediums of different standards, the exclusive light receiving surface which receives the RF signal without being affected by astigmatism, can restrain stray light from entering from a different layer, thereby it is possible to offer such an advantage that a reproduction signal having a high S/N ratio can be obtained during reproduction of a multilayer recording medium.

As stated above, although explanation has be made of the embodiments of the optical pickup and the optical disc unit according to the present invention, the present invention should not be limited to these embodiment, and various change and modification can be made without departing the technical concept of the present invention.

The invention claimed is:

1. An optical pickup comprising:
   a first laser source;
   a second laser source configured to emit a laser beam having a wavelength different from that of a laser beam emitted from the first laser source;
   an optical component having an optical element in which a dichroic mirror film and a polarization beam splitter (PBS) mirror film are formed in parallel with each other, a ¼ wavelength plate, and a nonpolarization mirror; and
   objective lenses configured to focus the laser beams emitted from the laser sources onto an optical disc;
   wherein the dichroic mirror film and the polarization beam splitter (PBS) mirror film of the optical element make an angle of 45 degrees to the mirror surface of the nonpolarization dichroic mirror film, and laser beams emitted from the first and second laser source are incident upon the optical component, and the laser beams emerged from the optical component are incident upon the objective lenses; and
   wherein the direction in which the laser beam emitted from the first laser source is incident upon the optical component and the direction in which the laser beam emitted from the second laser source is incident upon the optical component are different from each other by an angle of 180 degrees.

2. The optical pickup as set forth in claim 1, wherein the optical component is configured such that the laser beam emitted from the first laser source is reflected upon the dichroic mirror film and is incident upon the objective lens, and the beam emitted from the second laser source is reflected upon the PBS mirror film, then being transmitted through the ¼ wavelength plate, and after being reflected upon the nonpolarization mirror film, is transmitted through the ¼ wavelength plate, the polarization beam splitter (PBS) mirror film and the dichroic mirror film.

3. The optical pickup as set forth in any one of claims 1 or 2, wherein the nonpolarization mirror film is formed on the outer surface of the ¼ wavelength plate.

4. The optical pickup as set forth in claim 3, wherein the light beam passing through the ¼ wavelength plate is a convergent beam.

5. An optical component comprising:
a dichroic mirror film;
a PBS mirror film;
a ¼ wavelength plate; and
a nonpolarization mirror film;
wherein the dichroic mirror film, the polarization beam splitter (PBS) mirror film, the ¼ wavelength plate, and the nonpolarization mirror film are arranged in the mentioned order; and
wherein the dichroic mirror film and the polarization beam splitter (PBS) mirror film are formed in parallel with each other on or in an integral optical element, and the dichotic mirror film and the polarization beam splitter (PBS) mirror film make an angle of 45 degrees to the nonpolarization mirror film.

6. The optical component as set forth in claim 5, wherein the integral optical element is formed with the dichroic mirror film, the polarization beam splitter (PBS) mirror film and the nonpolarization mirror film.

7. An optical pickup comprising:
a first laser source configured to emit a laser beam having a first Wavelength;
a second laser source configured to emit a laser beam having a second wavelength different from the first wavelength;
a third laser source configured to emit a laser beam having a third wavelength different from the first wavelength and the second wavelength;
a splitting means configured to split the laser beam having the first wavelength into a first optical path and a second optical path;
a first objective lens configured to focus the laser beam having the first wavelength on the first optical path and the laser beam having the second wavelength onto an optical disc;
a second objective lens configured to focus the laser beam having the first wavelength on the second optical path and the laser beam having the third wavelength onto the optical disc; and
an optical component configured to guide the laser beam having the first wavelength on the first optical path and the laser beam having the second wavelength which is incident upon in a direction differing from the direction of the laser beam on the first optical path by an angle of 180 degrees, toward the first objective lens, and configured to guide the laser beam having the first wavelength on the second optical path and the laser beam having the third wavelength which is incident upon in a direction differing from the direction of the wavelength on the second optical path by an angle of 180 degrees, toward the second objective lens, the optical component comprising a dichroic mirror film, a polarization beam splitter (PBS) mirror film and a nonpolarization mirror film, which are arranged in the mentioned order; wherein the dichroic mirror film and the polarization beam splitter (PBS) mirror film are formed in parallel with each other on or in an integral optical element, and the dichotic mirror film and the PBS mirror film make an angle of 45 degrees to the nonpolarization mirror film.

8. An optical disc drive comprising:
a motor configured to rotate an optical disc;
a rotating servo circuit configured to control a speed of the motor;
an optical pickup configured to irradiate a laser beam onto the optical disc, and configured to detect a reflected laser beam reflected from the optical disc, the optical pickup comprising:
a first laser source configured to emit a laser beam having a first wavelength;
a second laser source configured to emit a laser beam having a second wavelength different from the first wavelength;
a third laser source configured to emit a laser beam having a third wavelength different from the first wavelength and the second wavelength;
a splitting means configured to split the laser beam having the first wavelength into a first optical path and a second optical path;
a first objective lens configured to focus the laser beam having the first wavelength on the first optical path and the laser beam having the second wavelength onto an optical disc;
a second objective lens configured to focus the laser beam having the first wavelength on the second optical path and the laser beam having the third wavelength onto the optical; and
an optical component for to guide the laser beam having the first wavelength on the first optical path and the laser beam having the second wavelength which is incident upon in a direction differing from the direction of the laser beam on the first optical path by an angle of 180 degrees, toward the first objective lens , and configured to guide the laser beam having the first wavelength on the second optical path and the laser beam having the third wavelength which is incident upon in a direction differing from the direction of the wavelength on the second optical path by an angle of 180 degrees, toward the second objective lens, the optical component comprising a dichroic mirror film, a polarization beam splitter (PBS) mirror film and a nonpolarization mirror film, which are arranged in the mentioned order;
wherein the dichroic mirror film and the polarization beam splitter (PBS) mirror film are formed in parallel with each other on or in an integral optical element, and the dichotic mirror film and the polarization beam splitter (PBS) mirror film make an angle of 45 degrees to the nonpolarization mirror film.

* * * * *